(12) United States Patent
Procopiuc

(10) Patent No.: US 8,364,515 B1
(45) Date of Patent: Jan. 29, 2013

(54) METHOD AND SYSTEM FOR FACILITY LOCATION OPTIMIZATION

(75) Inventor: Cecilia M Procopiuc, Summit, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1465 days.

(21) Appl. No.: 11/382,826

(22) Filed: May 11, 2006

Related U.S. Application Data

(60) Provisional application No. 60/755,128, filed on Dec. 30, 2005.

(51) Int. Cl.
*G06Q 30/00* (2012.01)

(52) U.S. Cl. ............... 705/7.29; 705/14.57; 705/14.58; 705/39; 700/36; 455/500; 455/456.1

(58) Field of Classification Search ............... 705/14.38, 705/14.58
See application file for complete search history.

(56) References Cited

U.S. PATENT DOCUMENTS

| | | | | |
|---|---|---|---|---|
| 6,186,793 | B1* | 2/2001 | Brubaker | 434/107 |
| 6,829,222 | B2* | 12/2004 | Amis et al. | 370/238 |
| 7,447,509 | B2* | 11/2008 | Cossins et al. | 455/457 |
| 7,469,247 | B2* | 12/2008 | Cossins et al. | 1/1 |
| 7,548,915 | B2* | 6/2009 | Ramer et al. | 705/14.54 |
| 2001/0014868 | A1* | 8/2001 | Herz et al. | 705/14 |
| 2007/0061245 | A1* | 3/2007 | Ramer et al. | 705/37 |
| 2008/0052302 | A1* | 2/2008 | Dolley et al. | 707/100 |

OTHER PUBLICATIONS

Bush, C.A and Kennet, D.M and Prisbrey, J. and Sharkey, W.W. Computer Modeling of the Local Telephone Network, 2001, Telecommunications Systems, 18:4, pp. 359-383.*

Akella, Mohan R. and Batta, Rajan and Delemelle, Eric and Rogerson, Peter A. and Blatt, Alan and Wilson, Glenn, Base Station Location and Channel Allocation in a Cellular Network with Emergnecy Coverage Requirements, 2001, pp. 1-26.*
Aly, Adel A and Marucheck, Ann S, Generalized Weber Problem with Rectangular Regions, 1982, J. Opl Res. Soc., vol. 33, pp. 983-989.*
Hao, Qi and Soong, Boon-Hee and Gunawan, Erry and Ong, Jin-Teong and Soh, Cheong-Boon and Li, Zheng, A Low-Cost Cellular Mobile Communication System, 1997, IEEE Journal on Selected Areas in Communications, vol. 15, No. 7, pp. 1315-1326.*
Weigel, Don and Cao, Buyang, Applying GIS and OR techniques to Solve Sears Technician-Dispatching and Home-Delivery Problems, 1999, Interfaces, vol. 29:1, Jan.-Feb., pp. 112-130.*
Apostol, Tom and Mnatsakanian, Mamikon, Finding Centroids the easy way, 2000, Math Horizons, pp. 7-12.*
Doherty, Lance and Pister, Kristofer and Ghaoui, Laurent, Convex Position Estimation in Wireless Sensor Networks, 2001, Department of Electrical Engineering and Computer Science University of California Berkely, pp. 1-9.*
Montreuil, Benoit and Brotherton, Edith and Marcotte, Suzanne, Zone-Based facilities layout optimization, 2002, CENTOR Network Organization Technology Research Center, pp. 1-6.*
Moussaoui, Omar and Naimi Mohamed_2005_Distributed Energy Aware Routing Protocal for Wireless Sensor Networks, ACM, pp. 34-40.*

(Continued)

*Primary Examiner* — Jonathan G Sterrett
*Assistant Examiner* — Stephen S. Swartz
(74) *Attorney, Agent, or Firm* — Turocy & Watson, LLP

(57) ABSTRACT

Systems and methods for optimization of facility locations are disclosed, for example, wireless telecommunications facility locations. Among a plurality of cluster points, corresponding to wireless customers, optimal locations are determined for a predetermined number of cluster centers, each cluster center having a predetermined cluster radius that defines a cluster area. Among a plurality of cluster points, optimal facility locations are determined for a variable number of cluster centers, each cluster center having a minimum acceptable economic value.

31 Claims, 5 Drawing Sheets

OTHER PUBLICATIONS

Rakesh Agrawal, et al., "An Interval Classifier for Database Mining Applications," Proceedings of the 18th VLDB Conference, 1992, pp. 560-573.

P. K. Agrawal, et al., "Exact and Approximation Algorithms for Clustering," Algorithmica, 2002, pp. 201-226.

Moses Charikar, et al., "Incremental Clustering and Dynamic Information Retrieval," Siam J. Comput., 2004, vol. 33, No. 6, pp. 1417-1440.

Moses Charikar, et al., "Improved Combinatorial Algorithms for Facility Location Problems," Siam J. Comput., 2005, vol. 34, No. 4, pp. 803-824.

Moses Charikar, et al., "Algorithms for Facility Location Problems with Outliers," 10 pages.

Martin Ester, et al., "A Density-Based Algorithm for Discovering Clusters in Large Spatial Databases with Noise," published in Proceedings of 2nd International Conference on Knowledge Discovery and Data Mining (KDD-96), 6 pages.

Uriel Feige, "A Threshold of ln n for Approximating Set Cover," Journal of the ACM, vol. 45, No. 4, Jul. 1998, pp. 634-652.

David S. Johnson, et al., "The Prize Collecting Steiner Tree Problem: Theory and Practice," In Proceedings 11th ACM-SIAM Symp. on Discrete Algorithms, 2000, 10 pages.

Adam Meyerson, "Profit-Earning Facility Location," STOC '01, pp. 30-36.

Nimrod Megiddo, et al., "On the Complexity of Some Common Geometric Location Problems," Siam J. Comput. vol. 13, No. 1, Feb. 1984, pp. 182-196.

John Shafer, et al., "SPRINT: A Scalable Parallel Classifier for Data Mining," Proceedings for the 22nd VLDB Conference, 1996, pp. 544-555.

P. Schroeter, et al., "Hierarchical Image Segmentation by Multi-Dimensional Clustering and Orientation-Adaptive Boundary Refinement," Pattern Recognition, 1995, vol. 28, No. 5, pp. 695-709.

David B. Shmoys, et al., "Approximation algorithms for facility location problems," Aug. 6, 1998, pp. 1-21.

V. N. Vapnik, et al., "On the Uniform Convergence of Relative Frequencies of Events to Their Probabilities," Theory of Probability and Its Applications, vol. XVI, No. 2, pp. 264-280.

* cited by examiner

METHOD AND SYSTEM FOR FACILITY LOCATION OPTIMIZATION

This application claims priority to provisional U.S. application Ser. No. 60/755,128, filed Dec. 30, 2005, herein incorporated by reference.

FIELD OF THE INVENTION

The present invention relates to facility location optimization. More particularly, the invention relates to methods and systems that allow the geographic location of facilities to be optimized based on the location of other facilities and costs associated with various locations for facilities.

BACKGROUND OF THE INVENTION

Clustering a set of points into a few groups is frequently used for analysis and classification in numerous applications, including facility location (D. Shmoys, E. Tardos, and K. Aardel, "Approximation algorithms for facility location problems," Proc. 29th Annu. ACM Sympos. Theory Comput., pages 265-274, 1997), information retrieval (M. Charikar, C. Chekuri, T. Feder, and R. Motwani, "Incremental clustering and dynamic information retrieval," Proc. 29th Annu. ACM Sympos. Theory Comput., pages 626-635, 1997), data mining (J. Shafer, R. Agrawal, and M. Mehta, "Sprint: A scalable parallel classifier for data mining," Proceedings of the International Conference on Very Large Databases, pages 544-555. Morgan Kauffman, 1996), and image processing (P. Schroeter and J. Bigiin, "Hierarchical image segmentation by multi-dimensional clustering and orientation adaptive boundary refinement," Pattern Recogn., 28(5):695-709, 1995). Because of such a diversity of applications, several variants of clustering problems have been proposed and widely studied.

In general, a clustering problem requires the partition of all data points into a set of clusters, so as to optimize a given objective function. The points usually lie in a metric space ($\mathbb{R}^d, L_p$) ($L_p$ is usually $L_1$, $L_2$, or $L_\infty$) and some clustering measure (such as maximum cluster radius, or sum of distance from points to cluster centers) is provided. The objective is then either to minimize the clustering measure, given the total number of clusters, or to minimize the number of clusters, given the clustering measure. This invention is directed to a different approach, arising from the necessity to more flexibly model several practical applications.

Recent advances in wireless technology have opened the door to alternative access to customer locations, other than the traditional land lines, leading to the apparition of new companies and new services in the telecommunications industry. A natural question that arises is how to choose the locations for the base stations so as to optimize the coverage, while minimizing capital investment costs. Because of technological requirements, each base station covers a fixed-radius circle around it. Hence, one way to formulate the problem is to compute the minimum number of clusters of given radius that cover all the customer location points. However, financial considerations generally enforce additional restrictions, such as limiting the number of clusters, or requiring a cluster to achieve some minimum customer coverage in order to make it financially viable. Moreover, it is more important to reach some customers than others, based on their monthly spending or contract stipulations. Hence, we must allow for the possibility of outliers (i.e. locations that remain unclustered), as well as adjust the objective function to take into account these additional issues. The problem is a general facility location one, and can be of interest to other domains and applications.

One approach to this problem appeared in A. Meyerson, "Profit-earning facility location," Proc. 33rd Annu. ACM Sympos. on Theory Comput., pages 30-36, 2001, in which a problem related to problem (PC2), as described later in this specification, was defined. The proposed algorithms return solutions which violate both radius and minimum profit constraints, making them difficult to compare to our results.

A widely studied class of problems, often referred to by the generic term facility location, defines the objective function to be a linear combination of the cost to set up facilities and the cost to connect customer locations to open facilities. In this case, however, the connection cost per facility is proportional to the sum of distances from the facility to the customers it serves. While this is a good model for applications in which a cost-per-mile is paid for each customer, it is clearly not the appropriate one for the problem we considered above. Moreover, the algorithms developed for this class of problems attempt to connect all the customer locations, not allowing for the possibility of outliers. These issues are discussed in M. Charikar and S. Guha, "Improved combinatorial algorithms for facility location and k-median problems," Proc. 40th Annu. IEEE Sympos. Found. Comput. Sci., pages 378-388, 1999).

Another related approach is the so-called prize-collecting Steiner tree problem, as discussed in D. S. Johnson, M. Minkoff, and S. Phillips, "The prize collecting steiner tree problem: theory and practice," Proc. 11th Annu. ACM-SIAM Symp. on Discrete Algorithms, pages 760-769, 2000. In this approach, each point is associated with a prize, and the goal is to compute a subtree minimizing the sum of the total cost of subtree edges plus the total prize of vertices not contained in the subtree. While this problem clearly allows for outliers, and the decision on which points to leave uncovered is based on a notion of how important the point is (i.e. how big is its prize), yet again the cost function depends on sum of distances, rather than maximum radius.

Finally, center clustering problems in the presence of outliers have been considered in M. Charikar, S. Khuller, D. M. Mount, and G. Narasimhan, "Algorithms for facility location problems with outliers," Proc. 12th Annu. ACM-SIAM Sympos. Discrete Algorithms, pages 642-651, 2001. There, a maximum number of outliers is provided as a parameter. Because of the way the objective function is defined, the optimal solution always leaves unclustered the maximum number of points allowed. Hence, the solution is highly sensitive to the user's estimate on the number of outliers. Moreover, the objective function is to minimize the cluster radius, given a fixed number of clusters, which does not correspond to our restriction that the cluster radius be fixed. Database research has also considered the problem of clustering with automatic detection of outliers (e.g. DBSCAN and M. Ester, H.-P. Kriegel, J. Sande, and X. Xu, "A density-based algorithm for discovering clusters in large spatial databases with noise," Proc. 2nd Intl. Conf. on Knowledge Discovery and Data Mining, pages 226-231, 1996). However, clusters can be arbitrarily shaped, which again does not satisfy our requirement.

Let $P=\{p_1, \ldots, p_n\}$ be a set of points, so that each point is associated with a potential profit $w(p_i) \geq 0$, and let $r>0$ denote the cluster radius. The system and method of the present invention is directed to two problems, (PC1) and (PC2): (PC1) Given $k>0$, compute k clusters of radius r so that the clustering profit, defined as $\Sigma_{p_i:clustered} w(p_i)$ is maximized; and (PC2) Given a minimum profit $W>0$ compute the set of clusters of radius r that maximizes the clustering profit, under the restriction that each cluster C of the solution satisfies the minimum profit requirement $\Sigma_{p_i \text{ assigned to } C} w(p_i) \geq W$.

BRIEF SUMMARY OF THE INVENTION

Aspects of the present invention overcome problems and limitations of the prior art by providing systems and methods that allow the optimization of the location of facility locations. The location of cluster centers among a group of cluster points is optimized by a computer-implemented method. Each cluster center has a predetermined cluster radius that defines an area. Each cluster point has an associated cluster point value, and the system optimizes the sum of the cluster point values within the chosen cluster areas.

In an embodiment of the invention, the number of cluster centers is predetermined. The system selects a first set of cluster center locations corresponding to the predetermined number of cluster centers and defines a first cluster area associated with the radii of the cluster centers. This first selection is done via a greedy algorithm. The system then calculates a first prize value corresponding to the sum of cluster points within the first cluster area. The system then selects a subset of cluster points and a corresponding subset of cluster centers that define a subset area. This second selection is done via a randomized method and depends on the prize value previously computed. The system computes the optimal subset prize value associated with the subset of cluster points contained within the subset cluster area, and selects the corresponding optimal set of cluster center locations.

In another embodiment of the invention, the location of a variable number of cluster centers is optimized by a computer-implemented method among a plurality of cluster points. Each cluster center has a predetermined cluster radius and an associated minimum acceptable prize value. The method includes defining a plane corresponding to the plurality of cluster points. The plane is divided into a plurality of horizontal strips, each horizontal strip having a height corresponding to the cluster radius. The method further includes using dynamic programming to select cluster center locations and associated cluster points within each of the plurality of horizontal strips.

In a further refinement of the method, a grid is first imposed on the plane. The cluster points are translated to grid points, after which the plane is divided into horizontal strips. The cluster centers are selected within each of the plurality of horizontal strips using dynamic programming. The method further consists of shifting the first horizontal strip relative to the second horizontal strip and repeating the previous step to optimize the prize value associated with the location of cluster centers.

In an embodiment of the invention, each cluster center may correspond to a broadband wireless antenna having an associated economic cost and the radius of each cluster center may correspond to a broadcasting range of the wireless antenna. The cluster points may correspond to locations of broadband customers. The cluster point value corresponds to a monetary access charge paid to reach a customer via a leased land line.

In certain embodiments of the invention, the present invention can be partially or wholly implemented with a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures.

The details of these and other embodiments of the present invention are set forth in the accompanying drawings and the description below.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 4(*b*) illustrates a proof of Lemma 4.1 described in further detail later in the specification.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

The system and method optimizes, by way of example, the layout of a set of broadband wireless antennas (e.g., WiMax, an abbreviation for Worldwide Interoperability for Microwave Access) which have a limited broadcasting range in a given geographic area of a footprint of a wireless provider. The system and method deploys wireless technologies in order to reach a wireless provider's existing customers directly (thus removing the current access charges the company has to pay in order to lease land lines from local phone companies). However, the same methodology can be applied to any other facility location problem where there are similar geographic and economic constraints.

As is readily appreciated by one of ordinary skill in the art, the system and method of the present invention can be employed through the use of a programmable computer that executes machine readable instructions.

Figure 1:
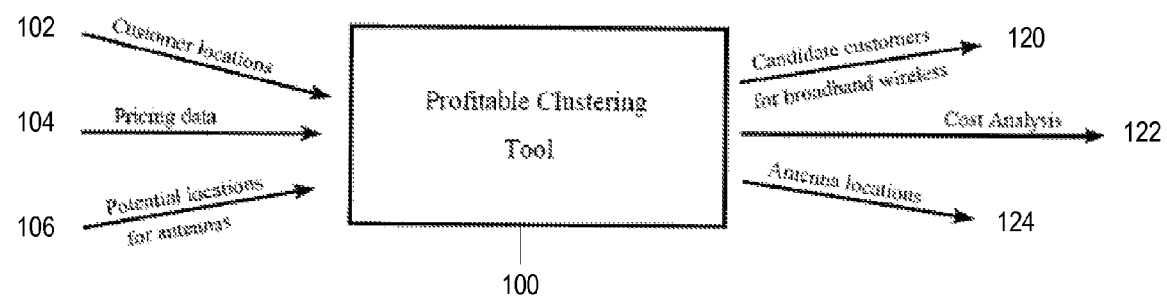
FIG. 1 is a flow diagram of the input and output data of the system and method of the present invention.

FIG. 1 shows a flow diagram that illustrates the type of information considered and generated by the system and method 100. Customer location information 102, pricing information 104 and potential facility locations 106 are provided as input data. Customer location information 102 may be expressed in latitude and longitude degrees. Pricing information 104 is both for the customers (e.g. the dollar amount the company currently pays to reach that customer), and for facilities, such as the antennas and antenna site(s) (the start-up cost for equipment, site leasing and so on).

As an output, the system and method returns a subset of candidate customers 120, and a subset of base station or antenna locations 124 for which there is a large economic benefit based on a cost analysis 122.

The benefit is the difference between the total savings in access charges, and the capital investment for the new technology, amortized over a given period of time. In addition, the customer sites are clustered around base stations for which they are within broadcasting range (hence the name profitable clustering).

The invention is directed to a system and method for clustering with outliers, which we call profitable clustering. Given a set of points, each of which is associated with a profit (or prize), and a fixed or predetermined cluster radius, the system and method computes a set of "profitable" clusters, where the profit of a cluster is the sum of profits of the points assigned to it.

One embodiment of the invention is directed to the situation where the number of clusters is given. This embodiment corresponds to the case when the initial capital expenditure amount is fixed, thus providing a limit on the number of clusters.

Another embodiment of the invention is directed to a minimum profit threshold defined for any cluster. This embodiment corresponds to the case when there is no upper bound on the initial investment, but each selected cluster must cover a minimum level of profit, which models the fact that the initial setup cost will be amortized over a given time period by the new prize it brings in.

In both cases, the goal is to maximize the overall clustering profit, i.e. the sum of all cluster profits.

Notations

Let $P=\{p_1, \ldots, p_n\}$ be a set of n data points in a metric space ($\mathbb{R}^d, L_p$) so that each point $p_i \in P$ is associated with a profit $w(p_i) \geq 0$. Let S be another, possibly infinite, set of points in ($\mathbb{R}^d, L_p$) (S is the set of potential cluster centers), and let $r>0$ be the cluster radius.

A cluster C is defined to be an $L_p$-disk of radius r centered at some point of S, i.e., $C=\{x \mid \|x-s\|_p \leq r\}$ for some fixed $s \in S$. In particular, if $L_p = L_2$ (the Euclidean metric), then a cluster is a hypersphere; and if $L_p = L_\infty$, then a cluster is a hypercube. We study three cases, depending on how S is defined. If S=P then the clusters are centered at the data points, and we have the discrete versions of the two problems (PC1) and (PC2) defined below. If $S=\mathbb{R}^d$, then the clusters can be centered at any point. For the practical application we describe in the experimental section, S is finite but generally distinct from P.

For problem (PC2), which has a minimum requirement on the cluster profit, it will be important to insure that, if a point is covered by multiple clusters, its profit is counted only for one of them. We therefore introduce the notion of valid assignment as follows. Given a set of clusters $C=\{C_1, \ldots, C_k\}$, a valid assignment with respect to C is a partial mapping $x$ from P to C so that, if then $x(p_i)=C_j$ then $p_i \in C_j$: and if $x(p_i)$ is undefined, then $p_i \notin \cup_{j=1}^k C_j$. In the latter case we say that $p_i$ is an outlier. Hence, $x$ assigns each point of P that is geometrically covered by at least one cluster, to exactly one such cluster.

Given a set of clusters $C=\{C_1, \ldots, C_k\}$, we define the clustering profit associated with C to be $$w(\mathcal{C}) = \sum_{p_i \in \cup_{j=1}^k C_j} w(p_i).$$

If in addition a valid assignment $x$ is provided, then we define the cluster profit of a cluster $C_i$ as $$w(C_i) = \sum_{p_j : x(p_j) = C_i} w(p_j).$$

Note that in this case $w(\mathcal{C}) = \sum_{i=1}^k w(C_i)$.

The two profitable clustering problems to which the present invention is directed are set forth as follows.

(PC1) Given an integer $k>0$, compute a set C of k clusters that maximizes the clustering profit $w(\mathcal{C})$ over all such k-clusterings.

(PC2) Given a positive number $W>0$, compute a pair (C, $x$), where C is a set of clusters and $x$ is a valid assignment with respect to C, such that $w(C) \geq W$ for each cluster $C \in \mathcal{C}$, and the clustering profit $w(\mathcal{C})$ is maximized.

Figure 3:
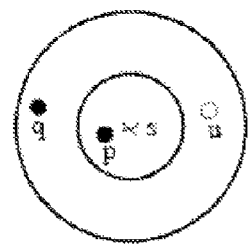
FIG. 3 shows a generalized cluster according to the present invention.

Note that for (PC2) the number of clusters is not specified. We will also consider a generalization of (PC1) as follows. Let $P_1$ and $P_2$ be two disjoint sets, and let S be the set of potential cluster centers. Let $r_1, r_2 \geq 0$ be two cluster radii. Then a generalized cluster is a pair of two $L_p$ disks, one of radius $r_1$ and the other of radius $r_2$, centered at the same point $s \in S$. Let $C=(D(s,r_1), D(s,r_2))$ be such a cluster. For any $p \in P_1 \cup P_2$, we say that $p \in C$ if and only if $p \in ((P_1 \cap D(s,r_1)) \cup (P_2 \cap D(s,r_2)))$. Note that, while one of the sets $P_1 \cap D(s,r_2)$ or $(P_2 \cap D(s,r_1))$ is non-empty in general, they are not subsets of C. FIG. 3 shows a generalized cluster, where C: p, $q \in P_1$, $u \in P_2$, and $r_1 \leq r_2$. Then p, $u \in C$, but $q \notin C$.

This generalized version is useful in certain practical applications, and it can be easily handled by adapting the algorithm for (PC1). The definition of clustering profit remains the same, except that the membership relationship between a point and a cluster refers to the definition above, rather than to geometrical coverage. Then the generalization (GPC1) of (PC1) is defined as (GPC1) Given an integer $k>0$, compute a set C of k generalized clusters that maximizes the clustering profit $w(\mathcal{C})$ over all such k-clusterings.

In fact, (GPC1) can be defined for more than two datasets, i.e. we can consider a constant number of mutually disjoint sets $P_1, \ldots, P_q$, and corresponding cluster radii $r_1, \ldots, r_q$. However, the generalization of our results to more than two datasets is immediate, so we only describe them for q=2. We prove below that the profitable clustering problems defined above are NP-Hard. A problem is NP-Hard if any problem in NP is reducible to it via a polynomial transformation, where NP denotes the class of problems solvable by a non-deterministic Turing machine in polynomial time. No polynomial time algorithm is known for any NP-Hard problem.

Theorem 2.1 (PC1), (PC2) and (GPC1) are NP-Hard.

Proof: It is well known that the following clustering problem, which we denote by (D), is NP-Hard (see N. Megiddo and K. J. Supowit, "On the complexity of some common geometric location problems," *SIAM J. Comput.*, 13(1):182-196, 1984): Given a set of points P, a cluster radius $r>0$, and a positive integer k, return "yes" if P can be covered by k clusters of radius r and "no" otherwise. This immediately reduces to (PC1) by defining $S=\mathbb{R}^d$ and $w(p_i)=1$ for each $p_i \in P$. If the optimal clustering profit for (PC1) is less than |P| then the answer to the decision problem (D) is "no", otherwise the answer is "yes." Similarly, (D) reduces to (GPC1) as follows: Split the set P arbitrarily into two disjoint sets $P_1$ and $P_2$, define $r_1=r_2=r$, $S=\mathbb{R}^d$ and $w(p_i)=1$ for each $p_i \in P$.

In order to prove that (PC2) is NP-Hard, we adapt the proof originally provided by Megiddo and Supowit (N. Megiddo and K. J. Supowit, "On the complexity of some common geometric location problems," *SIAM J. Comput.*, 13(1):182-196, 1984), who reduced 3SAT to a dual of (D). Similarly, we reduce 3SAT to a dual of (PC2). In the Megiddo paper, each variable in a clause is represented in the reduction by a circuit of an even number of circles. Circuits corresponding to different variables may intersect in so-called junctions, so that the central junction circle belongs to both circuits and is odd-numbered in both. Finally, a clause is represented in the reduction by four circles: one central one, and three others that intersect the corresponding variable circuits. We maintain this construction and define values w for each circle as follows. Even-numbered circles in circuits have w=1 and odd-numbered circles have w=2, except for central junction circles, which have w=1. The central circle of a clause has w=3, and the other three clause circles have w=1. The minimum profit value is W=3. Following similar techniques from the Megiddo paper, one can prove that the instance of 3SAT is satisfiable if and only if the optimal solution to the dual of (PC2) is equal to Σw, where the sum is over all circles in the construction.

Approximating (PC1) and (GPC1)

Figure 2:
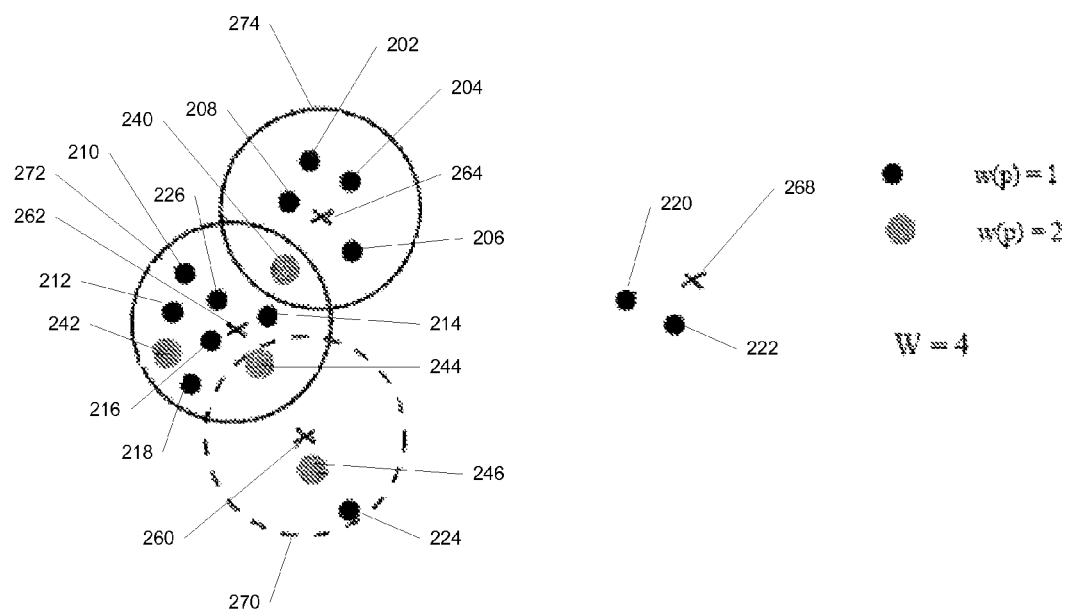
FIG. 2 shows examples of different locations of cluster points and cluster centers that may be determined in accordance with the present invention.

FIG. 2 shows an example of the method and system of the present invention. Small dots 202, 204, 206, 208, 210, 212, 214, 216, 218, 200, 222, 224 and 226 as well as large dots, 240, 242, 244 and 246 represent cluster points or customer sites, such as the location of broadband customers. Crosses 260, 262, 264, 266 and 268 are cluster centers or sites of potential broadband wireless base station locations. Circles 270, 272 and 274 represent the broadcasting area for the antenna base station at locations 260, 262 and 264, respectively. Each circle has a radius, for example circle 270 has a radius 280. The radius 280 defines the area of the circle 270.

In an exemplary scenario, an access charge that the company must pay for telephone land lines for the customers corresponding to small dots 202, 204, 206, 208, 210, 212, 214, 216, 218, 200, 222, 224 and 226 is $1 per month. In this scenario, the access charge that the company must pay for telephone land lines for the customers corresponding to the large dots 240, 242, 244 and 246 is $2 per month. Further assume in this scenario that the start-up cost for each of the antenna base stations is $48.

If the capital investment amount is fixed to $100, then the system and method chooses no more than two antenna base stations. The solution that maximizes the benefit is to place the antenna base stations at the crosses 262 and 264, corresponding to the centers of the circles 272 and 274, and to move all the customers within those circles (corresponding to dots 202, 204, 206, 208, 210, 212, 214, 216, 218, 224, and 226) from their current land line access to wireless access. Thus, the company saves 10*$1+3*$2=$16 per month in access charges. The two rightmost customers corresponding to small dots 220 and 222 remain unclustered; i.e., under this economic restraint, it is not profitable to move those customers from leased land line to wireless access.

We describe a (1-ϵ)-approximation algorithm for (PC1), and then discuss how the algorithm can be extended to handle (GPC1). The algorithm works in two phases: It first computes a (e-1)/e-approximate solution via a greedy algorithm, and then uses weighted randomized selection to compute a small subset $Q \subset P$. The subset Q has the property that it contains, with high probability, a k-clustering of benefit (relative to the entire set P) at least (1-ϵ) times the optimal. An optimal k-clustering for Q is then computed and returned as the approximate solution. FIG. 1 describes the greedy phase, denoted PC-GREEDY. At each iteration, it chooses the cluster that covers the largest overall profit, computed over points that have not already been covered by previous cluster. We use the notation C(s) to denote the cluster centered at s. For simplicity, we will also use the shorthand notation $w(R) = \Sigma_{p \in R} w(p)$ for any subset of points $R \subseteq P$.

---

Algorithm PC-Greedy
$P_0 = P$;
$wt(s) = \Sigma_{p \in P_0 \cap C(s)} w(p)$: center weight;
    (wt(s) = profit covered by C(s) and not already assigned);
For i = 1 to k
    1. Select $s_i \in S$ s.t. $wt(s_i) = \max_{s \in S} wt(s)$;
    2. $P_i = P_{i-1} \setminus C(s_i)$;
    3. Update $wt(s) = \Sigma_{p \in P_i \cap C(s)} w(p)$, $\forall s \in S$;
endfor;
return $\mathcal{C} = \{C(s_1), \ldots, C(s_k)\}$;

---

Let $\mathcal{G} = \{G_1, \ldots, G_k\}$ be the clustering computed by PC-GREEDY, and let W* denote the profit of an optimal k-clustering. Then $w(\mathcal{G}) \geq (e-1)/e \cdot W^*$ (see, e.g., U. Feige, "A Threshold of ln n for Approximating Set Cover," *Journal of the ACM*, 1998, vol. 45, pages 634-652). To compute the subset Q of P, we use the powerful probabilistic result of Vapnik and Chervonenkis ("On the Uniform Convergence of Relative Frequencies of Events to Their Probabilities," *Theory of Probability and its Applications*, 1971, vol. 16, pages 264-280) on ϵ-approximations, adapted for the weighted case. The set system in our case is defined as follows (for an introduction to the theory of set systems we refer the reader to, e.g., the book by J. Pach and P. K. Agarwal, "Combinatorial Geometry," J. Wiley & Sons, 1995). Let $\mathcal{D}$ be the set of all disks of radius r in $\mathbb{R}^d$ and let $\mathcal{D}^k$ be the family of k-tuples in $\mathcal{D}$. Then the set system induced by $\mathcal{D}^k$ on P has finite VC-dimension which depends only on k and d. We choose Q to be a random subset of P, where each $p \in P$ is chosen with probability w(p)/w(P). For any $0 < \epsilon, \delta < 1$, if Q has size $$\Theta\left(c(k,d)\frac{1}{\varepsilon^2}\log\frac{1}{\varepsilon} + \log\frac{1}{\delta}\right),$$

where c(k,d) is a sufficiently large constant that depends on k and d, then with probability at least 1−δ the set Q is a ϵ-approximation for the set system defined above. This implies that for any k-clustering $\mathcal{D}$ with disks of radius $$r, \left|w(\mathcal{D} \cap P) - w(\mathcal{D} \cap Q)\frac{w(P)}{w(Q)}\right| \leq \varepsilon w(P).$$

We prove the following
    Lemma 3.1 Let $$\varepsilon_1 = \frac{\varepsilon}{2}\frac{w(\mathcal{G})}{w(P)}$$

and let $Q \subset P$ be an $\epsilon_1$-approximation for the set system above. Then an optimal k-clustering over Q has benefit relative to the entire set P equal to at least (1−ϵ)W*, where W* is the benefit of an optimal k-clustering over P.

Proof: Let $\mathcal{C} = \{C_1, \ldots, C_k\}$ be an arbitrary k-clustering over the set P, and let $\mathcal{C}' = \{C'_1, \ldots, C'_k\}$, where $C'_i = C_i \cap Q$. Since Q is an $\epsilon_1$-approximation, it follows that $$w(\mathcal{C}) - \epsilon_1 w(P) \leq w(\mathcal{C}') \frac{w(P)}{w(Q)} \leq w(\mathcal{C}) + \epsilon_1 w(P).$$

If $\mathcal{C}$ is an optimal k-clustering over P, the left inequality implies that $$\left(1 - \frac{\epsilon}{2}\right) W^* \leq w(\mathcal{C}') \frac{w(P)}{w(Q)}.$$

Assume now that A' is an optimal k-clustering over Q, and let A denote the corresponding clustering over the entire set P. Then $$w(\mathcal{A}') \frac{w(P)}{w(Q)} \geq w(\mathcal{C}') \frac{w(P)}{w(Q)} \geq \left(1 - \frac{\epsilon}{2}\right) W^*.$$

We also deduce that $$w(\mathcal{A}') \frac{w(P)}{w(Q)} \leq w(\mathcal{A}) + \frac{\epsilon}{2} W^*.$$

Hence, $w(A) \geq (1-\epsilon) W^*$.

Once the set Q is chosen via weighted randomized selection, we compute an optimal k-clustering over Q by exhaustively enumerating all possibilities. Note that the number of centers we need to consider is independent of the size of S, the original set of centers. Indeed, we are only interested in centers that cover distinct (and non-empty) subsets of Q. In the dual, this translates to choosing centers that lie in distinct cells of the arrangement of disks of radius r, centered at points of Q. By a well known result from arrangements of congruent disks, the number of centers we have to consider is $O(|Q|^2)$. Thus, finding the optimal k-clustering over Q takes time $O(|Q|^{2k+1})$, which is independent of the sizes of the original sets P and S.

The running time of the greedy phase is the only one that depends on both $n=|P|$ and $m=|S|$. However, for $S=\mathbb{R}^d$ we show that it is sufficient to only consider a finite subset of centers $S_1 \subset S$. Let C be a cluster of arbitrary center $s \subset \mathbb{R}^d$. Then, be a simple geometric argument, there exists another cluster that covers $P \cap C$ and which, in addition, contain d points of P on its boundary. Hence, it is sufficient to consider centers only from a set $S_1$ of $O(n^d)$ points computed as follows. For each tuplet $(p_{i_1}, \ldots, p_{i_d})$, $p_i \in P$, add to $S_1$ the at most two points that are at distance r from all $p_{i_j}$, $1 \leq j \leq d$.

Each iteration of the greedy algorithm takes O(nm) to compute the updated center weights, and O(m) time to select the maximum weight. However, the running time can be significantly improved if for any center $s \in S$, there are only a constant number of other centers within distance 2r of s. This is in fact the case for the practical application we consider. In that case, only a constant number of center weights must be updated during an iteration. For each data point p, we store the constant-size list of centers within distance r of p. We also maintain the sorted list of center weights in a binary search tree, which can handle insertion, deletion, and selection of maximum value in O(log m). Since during each iteration only a constant number of weights are updated (i.e. deleted, modified, then re-inserted into the tree), the running time is O(n+ log m) per iteration.

The number of points selected randomly during the second phase, while independent of n and m, has (roughly) quadratic dependence on the ratio $w(P)/w(\mathcal{G})$, which is potentially very large. However, if this ratio is large, and since $w(\mathcal{G}) \geq (e-1)/e \cdot W^*$, this also implies that the ratio $w(P)/W^*$ is large, i.e. the optimal k-clustering only captures a small part of the overall profit. From an application point of view, in that case it is unlikely that an accurate approximation of the optimal solution is of interest. Rather (as in the application we consider here), it is an indication that either the parameters of the clustering should be changed (e.g. increase the number of clusters, the cluster radius, or both); or that the set of points is not a good candidate for profitable clustering, and should thus be discarded. In the example of broadband wireless deployment, the latter case corresponds to market areas in which the benefits from the new technology are not high enough to justify the original investment. For algorithmic purposes, we evaluate the ratio $w(P)/w(\mathcal{G})$ after the greedy phase. If the ratio is "small enough" (e.g. a small-degree polynomial in k and $\epsilon$), we proceed to the second phase. Otherwise, we return the result of the greedy approximation.

Extension to (GPC1) Algorithm PC-GREEDY has a natural extension to (GPC1). The only modification is that we must compute generalized clusters instead of standard ones, and that the membership relationship $p \in C$ is in the sense defined for generalized clusters, rather than the geometric sense. Similarly, the set system corresponding to k-tuples of generalized disks can be proved to have finite VC-dimension that depends only on k and d, and the rest of the results follow.

Approximating (PC2)

Referring again to FIG. 2, suppose there is no upper bound on the original investment, but each individual antenna base station must pay for itself within a year. Thus, each antenna base station must save a minimum of $48/12=$4 per month in access charges for the customers within its radius. The system and method will locate the antenna base stations in three locations, at the crosses 260, 262 and 264 centers of the solid and dashed circles. This solution requires an original investment of $144, and provides only slightly better savings per month than the solution described previously ($19 instead of $16). However, once the startup cost is amortized, it has better long-term benefits. Note that in this case, the dashed circle 270 is chosen because it covers two large dots 244 and 246 and one small dot 224, for a total of $5 per month in access savings. However, the customer corresponding to dot 244 is also covered by the circle 272. Thus, the system decides not only what customer sites and base station locations to choose, but how to assign each customer to a base station. If, for example, the dot 244 is first assigned to the circle 272, then the dashed circle 270 cannot be chosen, since it only covers a total of $3/month in savings, and no longer meets the minimum profitability requirement; the solution in that case is suboptimal. Again, the two rightmost customers corresponding to small dots 220 and 222 remain unclustered; i.e., under this economic constraint, it is not profitable to move those customers from leased land line to wireless access.

Figure 4:
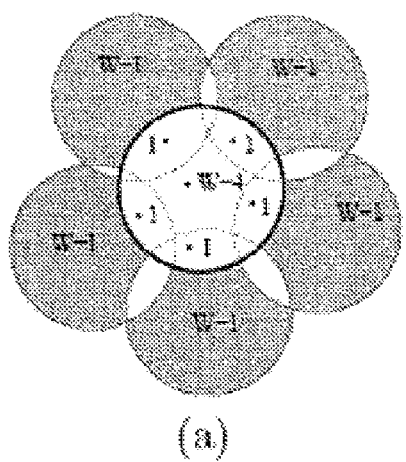
FIG. 4(*a*) illustrates performance of a greedy algorithm in accordance with the present invention.

A natural approach to approximate (PC2) is to adapt the greedy algorithm to handle the minimum cluster profit requirement. However, as the example in FIG. 4(a) illustrates, the approximation factor can become large. Each shaded area has profit W−1, and the only other points are the ones indicated in the figure (their profits are next to them). Then the clustering consisting of the five exterior circles has profit 5W.

The greedy clustering contains only the central circle, with a profit of W+1. Hence, the approximation factor for this example is almost 5. Examples with worse factors can be easily constructed.

In this section we set forth two methods that, while computing slightly infeasible solutions, achieve approximation factors of 2, respectively $(1+2/\epsilon)$, $0<\epsilon<1$. We first consider the problem under the $L_\infty$ metric in $\mathbb{R}^2$, and then discuss how to handle the $L_2$ metric. Thus, we are interested in computing a set of squares of side length $2r$ and a valid assignment such that each square has minimum profit W. We assume $S=\mathbb{R}^2$. The idea is to cut the plane into horizontal strips of height $2r$ and to solve the problem independently on each strip and take the union of the solutions. We therefore first focus on solving the problem on one such strip.

Strip Algorithm Let P be a set of points lying in a strip of height $2r$. We prove that we can compute the optimal solution for (PC2) under the $L_\infty$ metric, using dynamic programming. The algorithm relies on the following lemma.

Lemma 4.1 There exists an optimal solution $(\mathcal{C}, \mathcal{X})$ for (PC2) with the property that any vertical line $l$ intersects at most two clusters of C.

Figure 4B:
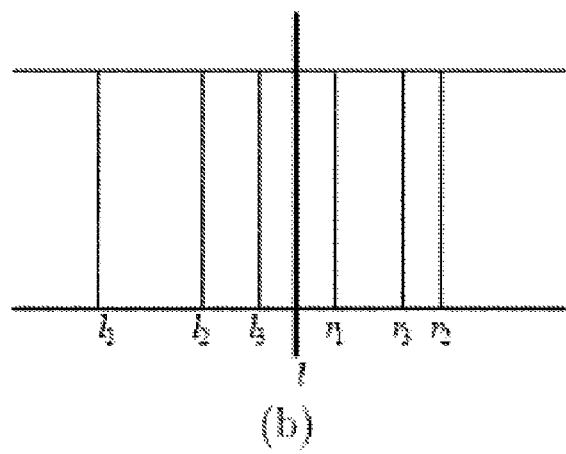

Proof: Let $(\mathcal{C}_1, \mathcal{X}_1)$ be an optimal solution, and assume that there exists a vertical line $l$ that intersects at least three squares $C_1, C_2, C_3$ of $\mathcal{C}$. Let $l_i, r_i$, $1 \leq i \leq 3$, be the x-coordinates of the leftmost, resp. rightmost, point assigned to $C_i$. Without loss of generality, assume $l_1 \leq l_2 \leq l_3$ as in FIG. 4(b). We consider two cases. If $r_2 \leq \max\{r_1, r_3\}$, re-assign all points p currently assigned to $C_2$, as follows: the points lying to the left of $l$ are re-assigned to $C_1$, and the points to the right of $l$ are reassigned to $C_1$, if $r_2 \leq r_1$, or to $C_3$ otherwise. Delete $C_2$ from $\mathcal{C}$. In the second case, we deduce that $l_2 \leq l_3 \leq r_3 \leq r_2$, and we reassign all points of $C_3$ to $C_2$ and delete $C_3$ from C. Repeat this process as long as there are more than two clusters intersecting $l$, and for all vertical lines $l$. Since we never add new clusters, the process converges after a finite number of steps. The clustering $(\mathcal{C}, \mathcal{X})$ satisfies the theorem. □

The strip algorithm uses a similar technique to the one from P. K. Agarwal and C. M. Procopiuc. "Exact and approximation algorithms for clustering," *Algorithmica*, 2002, pages 201-226. It sweeps a vertical line from left to right and maintains a set of partial clusterings with respect to $l$, i.e. clusterings that contain only squares that lie to the left of, or intersect $l$. For any partial clustering $\mathcal{C}_,$, if a square $C \in \mathcal{C}$ does not intersect the current sweep line, then $C$ can be ignored for the remainder of the procedure since it cannot cover any of the remaining points. It thus suffices to "identify" a partial clustering with the subset of its squares that intersect the sweep line. By Lemma 4.1, it is sufficient to consider only clusterings whose intersection with the sweep line consists of at most two squares. We maintain the invariant that all squares lying entirely to the left of $l$ have profit at least W. However, special care must be taken for the squares intersecting $l$, as some of the points assigned to them may lie to the right of $l$.

Formally, we define the signature of a partial clustering $(\mathcal{C}_, \mathcal{X})$ with respect to a vertical line $l$ to be the quadruple $(l_{i_1}, l_{i_2}, v_{i_1}, v_{i_2})$, such that, if $C_{i_1}$ and $C_{i_2}$ are the two squares of C intersecting $l$, then $l_{i_j}$, j=1,2, is the x-coordinate of the leftmost point assigned to $C_{i_j}$; and $v_{i_j} = \max(W - w(C_{i_j}), 0)$ is the minimum profit that must be assigned to $C_{i_j}$ so that $w(C_{i_j}) \geq W$ ($w(C_{i_j})$ is computed with respect to the current assignment $\mathcal{X}$. We assume $l_{i_1} \leq l_{i_2}$. If two partial clusterings have the same signature with respect to the sweep line, we store only the one that has larger profit.

During the sweep, we maintain a family $\mathcal{F} = \{(\mathcal{C}_1, \mathcal{X}_1), \ldots, (\mathcal{C}_u, \mathcal{X}_u)\}$ of all possible partial clusterings with respect to the sweep line, so that no two clusterings have the same signature, and so that each $(\mathcal{C}_i, \mathcal{X}_i)$ has the highest profit over all partial clusterings with the same signature. Let $x_1 \leq \ldots \leq x_n$ be the x-coordinates of the points in P. When the sweep line reaches the event point $x_i$, $\mathcal{F}$ is updated as follows. For each $(\mathcal{C}_, \mathcal{X}) \in \mathcal{F}$, we add a constant number of partial clusterings with respect to $l:x=x_i$. Let $(l_{i_1}, l_{i_2}, v_{i_1}, v_{i_2})$ be the signature of $(\mathcal{C}_, \mathcal{X})$ with respect to the previous position of $l$.

If $x_i - l_{i_1} > 2r$ and $v_{i_1} > 0$, or if $x_i - l_{i_1} \geq 2r$ and $v_{i_2} \geq 0$, delete $(\mathcal{C}_, \mathcal{X})$ from $\mathcal{F}$ (minimum profit requirement cannot be satisfied). Otherwise:

If $x_i - l_{i_1} \geq 2r$ then add $(\mathcal{C} \cup \{C^i\}, \mathcal{X}^1)$ to $\mathcal{F}$, where $C^i$ is the square whose left side passes through $x_i$, and $\mathcal{X}^1$ extends $\mathcal{X}$ by assigning $x_i$ to $C^i$. If $x_i - l_{i_1} \leq 2r$, add $(\mathcal{C}_, \mathcal{X}^2)$ to $\mathcal{F}$, where $\mathcal{X}^2$ extends $\mathcal{X}$ by assigning $x_i$ to $C_{i_2}$;

If $x_i - l_{i_1} \leq 2r$ then add $(\mathcal{C}_, \mathcal{X}^3)$ and $(\mathcal{C}_, \mathcal{X}^4)$ to $\mathcal{F}$, where $\mathcal{X}^3$ and $\mathcal{X}^4$ extend $\mathcal{X}$ by assigning $x_i$ to $C_{i_1}$, resp. $C_{i_2}$.

Once all partial clusterings have been updated, filter $\mathcal{F}$ so that, if two clusterings have the same signature with respect to the new sweep line, only the one with higher profit is kept. When the sweep line passes $x_n$, return the clustering in $\mathcal{F}$ with largest profit. The correctness of the algorithm follows from Lemma 4.1 and the way the family $\mathcal{F}$ is maintained. After each filtering step, $\mathcal{F}$ contains at most $n^2W^2$ partial clusterings, since that is the maximum number of distinct signatures. During an update phase, we spend constant time for each clustering in $\mathcal{F}$. Since there are n update phases, the running time is $O(n^2W^2)$. We summarize with the following.

Lemma 4.2 When the dataset P lies in a horizontal strip of height $2r$, the optimal solution to (PC2) under the $L_\infty$ metric can be computed in $O(n^3W^2)$ time.

First algorithm To compute an approximate solution for (PC2) in the general case, we cut the plane into horizontal strips of height $2r$ and compute the optimal solution in each non-empty strip, using the above algorithm. However, for each strip, we use a minimum profit requirement $W_1 = W/2$, instead of W. We return the union of the solutions in each strip.

Theorem 4.3 Let $W^*$ be the profit of the optimal solution for (PC2). The above algorithm computes a clustering $(\mathcal{C}_, \mathcal{X})$ that is slightly infeasible, in the sense that $w(\mathcal{C}) \geq W/2$ (rather than W), but which achieves a profit $w(C) \geq W^*/2$. The running time is $O(n^3W^2)$.

Proof: Let $(\mathcal{C}_1, \mathcal{X}_1)$ be an optimal solution. Each cluster $C \in \mathcal{C}_1$ intersects at most two horizontal strips. Therefore, at least half the profit of C lies in one strip. Let $\sigma$ be a strip, and let $C_{i_1}, \ldots, C_{i_q}$ be all the optimal clusters that have at least half of their profit in $\sigma$. There exist clusters $\overline{C}_{i_1}, \ldots, \overline{C}_{i_q}$ contained in $\sigma$ so that $(C_{i_j} \cap \sigma) \subset \overline{C}_{i_j}$. Define $\mathcal{X}_2(p) = \overline{C}_{i_j}$ if $p \in \sigma$ and $\mathcal{X}_1(p) = C_{i_j}$. Hence, $w(\overline{C}_{i_j}) \geq w(C_{i_j})/2 \geq W/2$ and the clustering $(\{\overline{C}_{i_1}, \ldots, \overline{C}_{i_q}\}, \mathcal{X}_2)$ has profit at least $\sum_{j=1}^q w(C_{i_j})/2$. We repeat this argument on all strips and use the fact that the strip algorithm computes the optimal solution, and the result follows.

Second algorithm If lowering the minimum profit requirement to W/2 is undesirable, we propose another algorithm that achieves a tradeoff between cluster radius and overall profit, but has minimum cluster profit W. We first draw a grid of step $\epsilon r$, for some $0 < \epsilon < 1$, and "snap" each point to its nearest grid point. Let $P_1$ be the multiset thus obtained. For any clustering of the original point set P, if we enlarge each cluster to radius $$r_1 = \left(1 + \frac{\epsilon}{2}\right)r,$$

we obtain a clustering of $P_1$ of equal (or larger) profit. We show how to compute a good clustering of $P_1$ of radius $r_1$. Let $\mathcal{T}_0$ denote a cutting of the plane into strips of height $2r_1$, so that the cutting lines are grid lines. By shifting the lines of $\mathcal{T}_0$ up by $\epsilon r, 2\epsilon r, \ldots$ we obtain a series of distinct cuttings $\mathcal{T}_1, \ldots, \mathcal{T}_{q-1}$ where $q=2/\epsilon+1$. Note that $\mathcal{T}_q=\mathcal{T}_0$. For each cutting, we compute the optimal clustering on each strip, and return the union of those clusters. The final output is the clustering of largest profit, over all cuttings $\mathcal{T}_i$. This is still a clustering of $P_1$. By enlarging each cluster to radius $r_2=(1+\epsilon)r$, we obtain a clustering of P.

Theorem 4.4 Let W* be the profit of the optimal solution for (PC2). The above algorithm computes a clustering ($\mathcal{C}_,$, $\mathcal{X}$) of profit $w(\mathcal{C}) \geq W^*/(1+2/\epsilon)$, using enlarged clusters of radius radius$(1+\epsilon)r$. The running time is $O((1/\epsilon)n^3W^2)$.

Proof: Let ($\mathcal{C}_1, \mathcal{X}_1$) be an optimal solution for $P_1$ with radius $r_1$. From the discussion above, it follows that $w(\mathcal{C}_1) \geq W^*$. Without loss of generality, assume that the lower side of each cluster $C \in \mathcal{C}_1$ rests on a grid line (otherwise, shift C up until this is true; since $P_1$ consists of grid points, the shifted square still covers all the points from before). We say that C is safe from a cutting $\mathcal{T}_i$ if it lies entirely in one of the strips of $\mathcal{T}_i$ (i.e., no cutting line intersects the interior of C). Let $w(\mathcal{T}_i) = \Sigma_{C \in \mathcal{C}_1, C \text{ safe from}} \mathcal{T}_i w(C)$. Then $\Sigma_{i=1}^{q-1} w(T_i) = w(\mathcal{C}_1)$, since each C is safe from exactly one cutting. Let $\mathcal{T}$ be such that $w(\mathcal{T}) = \max_i w(T_i)$. Then $w(\mathcal{T}) \geq w(\mathcal{C}_1)/q \geq W^*/(1+2/\epsilon)$ and the claim follows.

For the $L_2$ metric Lemma 4.1 no longer holds. However, note that for any $L_2$-clustering there exists an $L_\infty$-clustering with profit at least as big (simply replace each $L_2$-cluster by the $L_\infty$-cluster with the same center and radius). Solve the problem for the $L_\infty$ metric. Once a clustering is computed, replace each $L_\infty$-cluster by the $L_2$-cluster of the same center, but of radius $r\sqrt{2}$. The $L_2$-clustering thus obtained has profit at least as big as the computed $L_\infty$-clustering. The results of Theorems 4.3 and 4.4 extend to $L_2$, except that the cluster radius is $\sqrt{2}$ times the radius specified in each theorem.

Performance Evaluation

An experimental evaluation of algorithm PC-GREEDY shows that in practice its approximation factor can be much better than predicted by the theoretical analysis. In fact, it can be close to optimal, implying that the second phase is often unnecessary. Our set of data points P represents locations of interest in a major metropolitan area in the U.S. Similarly, the set of potential cluster centers represents a set of suitable locations in the same area. For each $p \in P$, the value $w(p)$ is a measure of the value of that location in an appropriately defined prize model. The size of dataset P is $O(10^4)$, while the size of S is $O(10^2)$.

Figure 5:
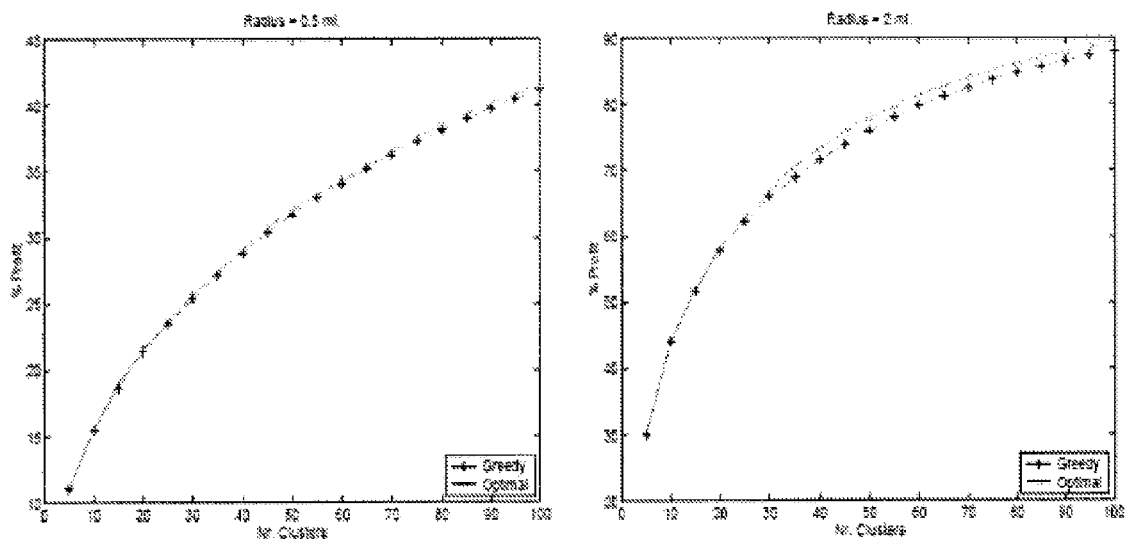
FIG. 5 illustrates a performance of a PC-GREEDY algorithm in accordance with the present invention compared to optimal clustering.

As shown in FIG. 5, for this particular data, the set of greedy clusters generated could also be considered an approximate solution to (PC2), since the clusters satisfy the minimum profit threshold as defined by the prize model.

In order to evaluate the relative performance of our method we generated optimal k-clusterings for various values of k. Since the problem (PC2) is NP-Hard, in order to compute such optimal solutions without exhaustively searching the space of all possible k-clusterings, we translated the problem into an integer program and used a highly optimized IP solver. We have conducted experiments for many different values of cluster radius, corresponding to both micro- and macro-cellular distances. The graphs in FIG. 5 show the profit of the optimal and greedy clusterings as a percentage of the total profit $\Sigma_{p \in P} \omega(p)$, for two such radii.

Both sets P and S are distributed similarly, following city streets, with higher density in the downtown area and certain suburbs. We expect that for many real-life applications PC-GREEDY will exhibit similarly high accuracy, particularly when the set S of possible cluster centers is selected using domain-specific knowledge.

Figure 6:
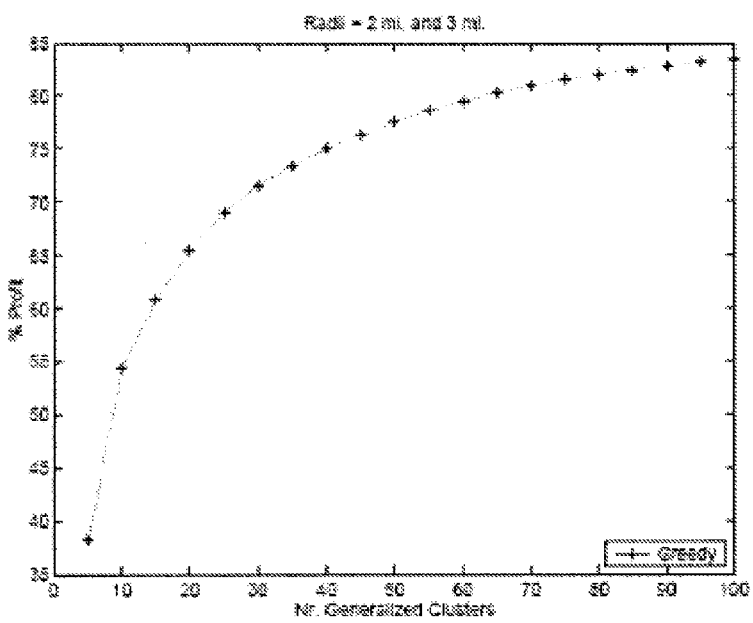
FIG. 6 illustrates performance of a PC-GREEDY algorithm for generalized clusters.

FIG. 6 shows an evaluation of PC-GREEDY on an instance of (GPC2). The sets P and S are as in the experiments above, and we use an additional dataset Q, $P \cap Q = \emptyset$. For the results in FIG. 6, we required the points of P to be covered at a radius of 2 miles, and the points of Q to be covered at 3 miles. The algorithm exhibits a very similar behavior to the one for the standard case.

Figure 7:
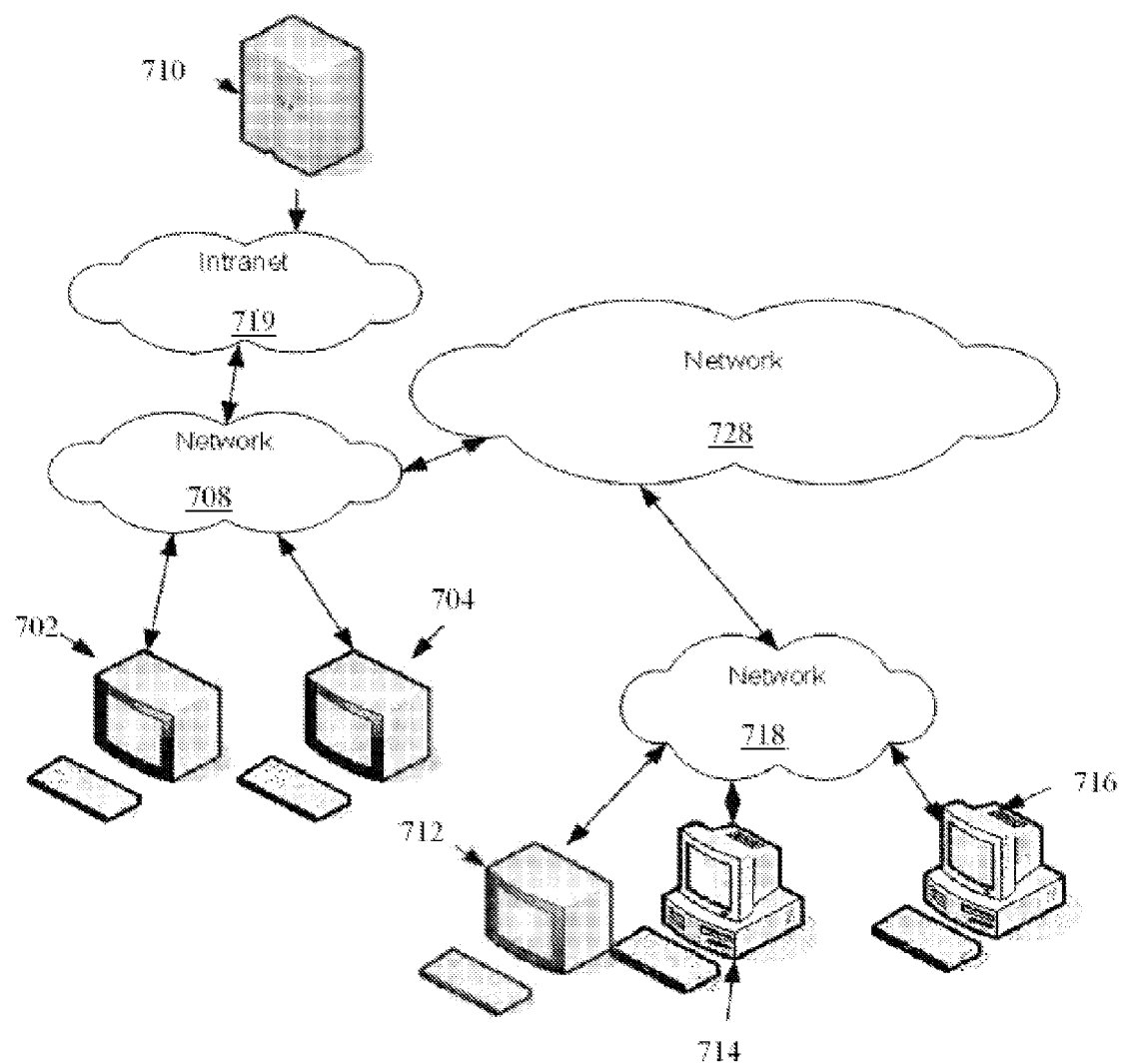
FIG. 7 shows an embodiment of a hardware configuration for implementation of the invention.

FIG. 7 shows a diagram of a computer system and network that may be used to implement aspects of the invention. A plurality of computers, such as workstations 702 and 704, may be coupled to a computer 712, via a network 708, 728, and 718. Computers 712, 714, and 716 may be coupled to a network 728 through network 718. Computers 712, 714, and 716, along with workstations 702 and 704 may be used for the splitting of program execution among many CPUs. Those skilled in the art will realize that other special purpose and/or general purpose computer devices may also be connected to other various networks, such as the Intranet 719, and used for parallelization. Such additional devices may include handheld devices, multiprocessor systems, microprocessor-based or programmable consumer electronics, networked PCs, minicomputers, mainframe computers, and the like.

One or more of the computers and terminals shown in FIG. 7 may include a variety of interface units and drives for reading and writing data or files. One skilled in the art will appreciate that networks 708, 718 and 728 are for illustration purposes and may be replaced with fewer or additional computer networks. One or more networks may be in the form of a local area network (LAN) that has one or more of the well-known LAN topologies and may use a variety of different protocols, such as Ethernet. One or more of the networks may be in the form of a wide area network (WAN), such as the Internet. Computer devices and other devices may be connected to one or more of the networks via twisted pair wires, coaxial cable, fiber optics, radio waves or other media.

While the invention has been described with respect to specific examples including presently preferred modes of carrying out the invention, those skilled in the art will appreciate that there are numerous variations and permutations of the above described systems and techniques that fall within the spirit and scope of the invention.

The invention claimed is:

1. A method for selecting a set of cluster center locations in a communication network environment, the method comprising:

selecting, by a system including at least one processor, a first set of cluster center locations corresponding to a predetermined number of cluster centers to approximate identifying the set of cluster center locations associated with an overall clustering providing a predefined profit in clustering of at least some of a plurality of cluster points, wherein respective cluster centers of the predetermined number of cluster centers have respective predetermined cluster radii defining respective areas;

defining a first cluster area based on the respective areas of the respective cluster centers of the predetermined number of cluster centers;

determining, by the system, a first calculated value corresponding to cluster points, of the plurality of cluster points, that are within the first cluster area;

selecting a subset of cluster points from the plurality of cluster points using weighted randomized selection, based on the first calculated value, and selecting a corresponding subset of cluster centers, comprising wireless antennas, wherein the corresponding subset of cluster centers define a subset area of the first cluster area, wherein the subset of cluster points has a predefined probability level of having a clustering of cluster points that provides at least a predefined portion of the overall clustering providing the predefined profit, based on the weighted randomized selection; and selecting the set of cluster center locations, comprising a first cluster center location having a first profit and including a first portion of cluster points of the subset of cluster points, based on the first profit being greater than a second profit associated with a potential cluster center location excluded from the set of cluster center locations, to attain at least the predefined portion of the overall clustering providing the predefined profit based on all cluster center locations in the set of cluster center locations, wherein the first profit is determined without regard to respective distances of cluster points of the first portion of cluster points from a first cluster center associated with the first cluster center location, and the first portion of cluster points is located within a first area defined by a predetermined first cluster radius of the first cluster center.

2. The method of claim 1, wherein cluster points within the first cluster area have an associated cluster point value, and the calculating the first calculated value further comprises calculating a sum of the cluster point values within the first cluster area.

3. The method of claim 1, further comprising:
identifying a first cluster point associated with a first cluster-point profit, a second cluster point associated with a second cluster-point profit, and a third cluster point associated with a third cluster-point profit, wherein the first cluster-point profit is greater than the second cluster-point profit, which is greater than the third cluster-point profit, and wherein the first cluster point, the second cluster point, and the third cluster point are part of the subset of cluster points; and selecting the first cluster point and the third cluster point to be in the first portion of cluster points, associated with the first cluster center location, over the second cluster point which is not selected to be included in the first portion of cluster points, wherein the second cluster point is closer in distance to the first cluster center than the first cluster point and the third cluster point, based on the first cluster point value being greater than the second cluster point value.

4. The method of claim 1, further comprising:
re-assigning a specified cluster point of the subset of cluster points from a first cluster associated with the first cluster center location to a second cluster associated with a second cluster location of the set of cluster center locations in response to the second cluster center location not meeting a predefined minimum acceptable profit per cluster center location, wherein the first cluster center location and the second cluster center location each at least meet the predefined minimum acceptable profit after the re-assigning of the specified cluster point to the second cluster.

5. The method of claim 1, wherein a particular cluster center of the predetermined number of cluster centers corresponds to a broadband wireless antenna having an associated economic cost, and a radius of the particular cluster center corresponds to a broadcasting range of the broadband wireless antenna.

6. The method of claim 5, further comprising identifying a second portion of cluster points of the subset of cluster points as outlier cluster points that remain unclustered after the selecting of the set of cluster center locations, wherein the second portion of cluster points is associated with the potential cluster center location excluded from the set of cluster center locations.

7. The method of claim 1, wherein at least one cluster point of the plurality of cluster points corresponds to a location associated with a broadband customer.

8. The method of claim 7, wherein at least one cluster point value associated with the at least one cluster point corresponds to a monetary access charge associated with the at least one cluster point.

9. A method for selecting a subset of cluster center locations associated with a communication network environment, the method comprising:
defining, by a system including at least one processor, a plane corresponding to a plurality of cluster points, wherein at least a portion of the plurality of cluster points is associated with a variable number of cluster centers, and cluster centers of the variable number of cluster centers have predetermined cluster radii;

dividing the plane into a plurality of horizontal strips, including at least a first strip and a second strip, each horizontal strip having a predetermined height corresponding to a predetermined cluster radius of a cluster center associated with that horizontal strip;

selecting, by the system, the subset of cluster center locations and associated cluster points comprising a subset of the plurality of cluster points within the plurality of horizontal strips, wherein the selecting the subset of cluster center locations includes enabling recovery of an economic cost relating to a subset of cluster centers, comprising wireless antennas, associated with the subset of cluster center locations within a predefined period of time, and at least one cluster center location of the subset of cluster center locations meets a predefined minimum acceptable economic profit; and determining a first economic profit of a first cluster center location of the subset of cluster center locations without regard to respective geographic distances of cluster points of a first portion of cluster points of the subset of cluster points from a first cluster center associated with the first cluster center location, wherein the first portion of cluster points is located within a first area defined by a predetermined first cluster radius of the first cluster center, and wherein the subset of cluster center locations comprises the first cluster center location and excludes a potential cluster center location based on the first economic profit meeting the predefined minimum acceptable economic profit and a potential economic profit of the potential cluster center location not meeting the predefined minimum acceptable economic profit.

10. The method of claim 9, further comprising identifying a second portion of cluster points of the subset of cluster points as outlier cluster points that remain unclustered after the selecting of the subset of cluster center locations, wherein the second portion of cluster points is associated with the potential cluster center location excluded from the subset of cluster center locations.

11. The method of claim 9, wherein, for respective horizontal strips of the plurality of horizontal strips, respective heights of the respective horizontal strips equal twice respective cluster radii of the respective horizontal strips.

12. The method of claim 9, wherein the selecting of the subset of cluster center locations and the associated cluster points further comprises:
selecting the subset of cluster center locations and the associated cluster points based on a dynamic programming algorithm; and
decreasing the predefined minimum acceptable economic profit by a defined factor.

13. The method of claim 9, wherein the first cluster center corresponds to a broadband wireless antenna having an associated economic cost that is recoverable within the predefined period of time based on the first economic profit.

14. The method of claim 13, wherein a first predetermined radius of the first cluster center corresponds to a broadcasting range of the broadband wireless antenna.

15. The method of claim 9, wherein at least one cluster point of the plurality of cluster points corresponds to a location associated with a broadband customer.

16. The method of claim 15, wherein at least one cluster point value associated with the at least one cluster point corresponds to a monetary access charge associated with the at least one cluster point.

17. A computer-readable storage device storing computer-executable instructions that, in response to execution, cause a system including at least one processor to perform operations, comprising:
defining a grid in a plane corresponding to a plurality of cluster points;
for cluster points of the plurality of cluster points, translating a cluster point to its nearest grid point and enlarging a predetermined cluster radius of a corresponding cluster center to a calculable cluster radius;
dividing the plane into a plurality of horizontal strips including at least a first strip and a second strip, wherein the plurality of horizontal strips have predetermined heights corresponding to the calculable cluster radius of the corresponding cluster center;
selecting a subset of cluster center locations and associated cluster points within the plurality of horizontal strips, wherein the subset of cluster center locations correspond to a subset of cluster centers of the variable number of cluster centers;
determining a first economic profit of a first cluster center location of the subset of cluster center locations without regard to respective geographic distances of cluster points of a first portion of cluster points of the subset of cluster points from a first cluster center associated with the first cluster center location, wherein the first portion of cluster points is located within a first area defined by a predetermined first cluster radius of the first cluster center; and
repeatedly shifting the first horizontal strip relative to the second horizontal strip to obtain a shifted set of horizontal strips and iteratively selecting the subset of cluster center locations and the associated cluster points for the shifted set of horizontal strips to identify overall clusterings associated with the shifted set of horizontal strips to facilitate obtaining a final clustering having a largest economic profit,
wherein the obtaining the final clustering having the largest economic profit includes selecting the subset of cluster center locations to enable economic cost relating to the subset of cluster center locations to be recoverable within a predefined period of time and at least one cluster center of the subset of cluster center locations at least meets a predefined minimum acceptable economic profit, and
wherein the subset of cluster center locations comprises the first cluster center location and excludes a second cluster center location based on the first economic profit meeting the predefined minimum acceptable economic profit and a second economic profit of the second cluster center location not meeting the predefined minimum acceptable economic profit.

18. The computer-readable storage device of claim 17, the operations further comprising identifying a second portion of cluster points of the subset of cluster points as outlier cluster points that remain unclustered after the selecting of the subset of cluster center locations, wherein the second portion of cluster points is associated with the second cluster center location excluded from the subset of cluster center locations.

19. The computer-readable storage device of claim 17, wherein, for respective horizontal strips of the plurality of horizontal strips, a height of a respective horizontal strip equals twice a respective calculable cluster radius associated with a respective cluster center of the variable number of cluster centers that is associated with that respective horizontal strip.

20. The computer-readable storage device of claim 17, wherein the selecting the subset of cluster center locations and the associated cluster points within the plurality of horizontal strips further comprises selecting of the subset of cluster center locations and the associated cluster points in response to determining that lowering the predefined minimum acceptable economic profit is unacceptable.

21. The computer-readable storage device of claim 17, wherein the first cluster center corresponds to a broadband wireless antenna having an associated economic cost.

22. The computer-readable storage device of claim 17, wherein a first radius of the first cluster center corresponds to a broadcasting range of a broadband wireless antenna.

23. The computer-readable storage device of claim 17, wherein a cluster point of the plurality of cluster points corresponds to a location associated with a broadband customer.

24. The computer-readable storage device of claim 17, wherein a cluster point of the plurality of cluster points is associated with a cluster point economic profit that is based on a monetary access charge paid by a broadband customer associated with that cluster point.

25. The method of claim 1, further comprising:
clustering a first cluster point and a second cluster point in the first cluster center location, wherein the first cluster point and the second cluster point are in the first portion of cluster points; and
determining a first cluster-point profit associated with the first cluster point and a second cluster-point profit associated with the second cluster point without regard to respective distances of the first cluster point and the second cluster point from the first cluster center.

26. The method of claim 25, further comprising:
determining the first cluster-point profit is greater than the second cluster-point profit even though the first cluster point is a further distance away from the first cluster center than the second cluster point.

27. The method of claim 25, further comprising:
determining the first profit of the first cluster center location based on the first cluster-point profit and the second cluster-point profit without regard to a sum of respective distances of the first cluster point and the second cluster point in relation to the first cluster center.

28. The method of claim 1, further comprising:
selecting the first set of cluster center locations corresponding to the predetermined number of cluster centers using a greedy algorithm to approximate the identifying of the set of cluster center locations associated with the overall clustering providing the predefined profit.

29. The method of claim 4, further comprising:
re-assigning the specified cluster point from the first cluster to the second cluster even though the specified cluster point is located a shorter distance away from the first cluster center than a second cluster center associated with the second cluster center location to facilitate enabling the second cluster center location to at least meet the predefined minimum acceptable profit.

30. The method of claim 9, further comprising:
selecting the subset of cluster center locations and the associated cluster points, wherein the subset of cluster point locations comprises the first cluster center location associated with the first economic profit and a second cluster center location associated with a second economic profit; and
assigning a first cluster point to the first portion of cluster points even though the first cluster point is located a shorter distance away from a second cluster center associated with the second cluster center location than the first cluster center to facilitate enabling the first cluster center location to at least meet the predefined minimum acceptable economic profit, wherein the second cluster center location also at least meets the predefined minimum acceptable economic profit.

31. The computer-readable storage device of claim 17, the operations further comprising:
enlarging clusters respectively associated with the subset of cluster center locations to a second calculable cluster radius.

\* \* \* \* \*